United States Patent [19]

Horsch

[11] 4,328,876
[45] May 11, 1982

[54] STEPLESS HYDROMECHANICAL STEERING BY DRIVING

[75] Inventor: Joachim Horsch, Lombard, Ill.

[73] Assignee: International Harvester Company, Chicago, Ill.

[21] Appl. No.: 75,788

[22] Filed: Sep. 17, 1979

[51] Int. Cl.³ .......................................... B62D 11/18
[52] U.S. Cl. ................................ 180/6.44; 180/6.48; 60/436
[58] Field of Search ...................... 180/6.44, 6.7, 6.48; 60/435, 436; 74/718, 720, 730; 192/0.096, 0.098, 13 R, 12 C

[56] References Cited

U.S. PATENT DOCUMENTS

| | | | |
|---|---|---|---|
| 2,336,911 | 12/1943 | Zimmermann | 180/6.7 |
| 2,353,554 | 7/1944 | Gates | 74/710.5 |
| 2,401,628 | 6/1946 | Eksergian | 180/6.2 |
| 2,446,242 | 8/1948 | Orshansky, Jr. | 180/6.48 |
| 2,580,946 | 1/1952 | Orshansky, Jr. et al. | 180/6.2 |
| 2,961,057 | 11/1960 | Johnson | 180/6.2 |

Primary Examiner—Robert R. Song
Assistant Examiner—Donn McGiehan
Attorney, Agent, or Firm—John W. Gaines; Ronald C. Kamp; F. David AuBuchon

[57] ABSTRACT

Crawler tractor adapted for stepless hydromechanical or electromechanical steering by driving. The tractor, in which opposite axles have interposed solid axle steering drive means, is steered by means of clutches disposed one between the drive means and each axle for primary mechanical drive, and a secondary variable ratio hydrostatic bidirectional drive interconnecting the axles.

25 Claims, 4 Drawing Figures

STEPLESS HYDROMECHANICAL STEERING BY DRIVING

This invention relates to stepless hydromechanical or electromechanical steering by driving. It more particularly relates to steering a crawler tractor, in which opposite axles have interposed solid axle steering drive means, by means of clutches disposed one between the drive means and each axle for primary mechanical drive, and a secondary variable ratio hydrostatic or electrical bidirectional drive interconnecting the axles.

Background patents include but are not limited to U.S. Pat. Nos. 2,336,912, 2,996,135, 3,744,584, 3,815,698, 3,862,668, 4,019,596, 4,093,048, and especially U.S. Pat. Nos. 2,401,628, 2,446,242, and 2,580,946. The novelty to be found here points up to various deficiencies in those prior disclosures and particularly to differences noted in a U.S. Pat. No. 2,336,911 disclosing a bidirectional, fixed displacement drive requiring not only a separate pump to power the fixed displacement drive for turns, but also differentialing of the driven axles which proves to be a crucial advantage on the turns, but a detriment to straight line steering. The disclosure to follow brings out notable differences particularly apparent in U.S. Pat. No. 2,353,554 which teaches not only clutches between a drive and the driven axles, but also a differential interconnecting the driven axles, the differential itself requiring a steering brake or clutch on it; steering is apparently done by brake drag or slip clutch action, wholly mechanically.

A crawler tractor has straight line steering or else it turns, as just mentioned regarding the case of Pat. No. 2,336,911 and depending in all cases upon whether, relative to a reference track driven by the axle at one side, the same speed or a slower speed is being attained by the other (inside) axle driven track. According to the present invention, the reference track clutch provides a 100 percent mechanical 1:1 drive to its track both during straight line steering and on all turns in the direction of the other (inside) track. Also that same clutch, on all said turns in the direction of the inside track, is the sole source for powering the secondary variable ratio hydrostatic bidirectional drive so that the same can hydrostatically or electrically drive the inside track. At times, primarily for small steering corrections where steering drive torque being transmitted in low gear may be appreciable, the inside track clutch is operated as a slip clutch to mechanically augment the hydrostatic or electrical torque to the inside track.

The objectives if not seen as altogether unexpected here are nevertheless not believed all obvious ones and include: adding dual, variable displacement hydrostatic units to a standard clutch/brake steering crawler in a manner adapting it for stepless hydrostatic/mechanical steering; doing so in that manner using small size units for each of the dual units; affording a neutral steering drive mode so that the crawler when the tracks are stopped will have freedom from any tendency to creep; during all turns, at least partially declutching the inside track enabling it fully independently to be slowed an amount without reaction of the outside track either way in trying to speed up or slow down a proportional amount; positively mechanically linking the tracks together in 1:1 drive during straight line steering so that there is no steering drift; and inter-communicating the dual units with a cross feed which is automatically bypassed during straight line steering to insure against one unit's feed from outstripping the other and building up a substantial hydraulic back pressure to work against.

Further features, objects, and advantages will either be specifically pointed out or become apparent when, for a better understanding of the invention, reference is made to the following description taken in conjunction with the accompanying drawings which show a preferred embodiment thereof and in which:

Figures 1, 4:
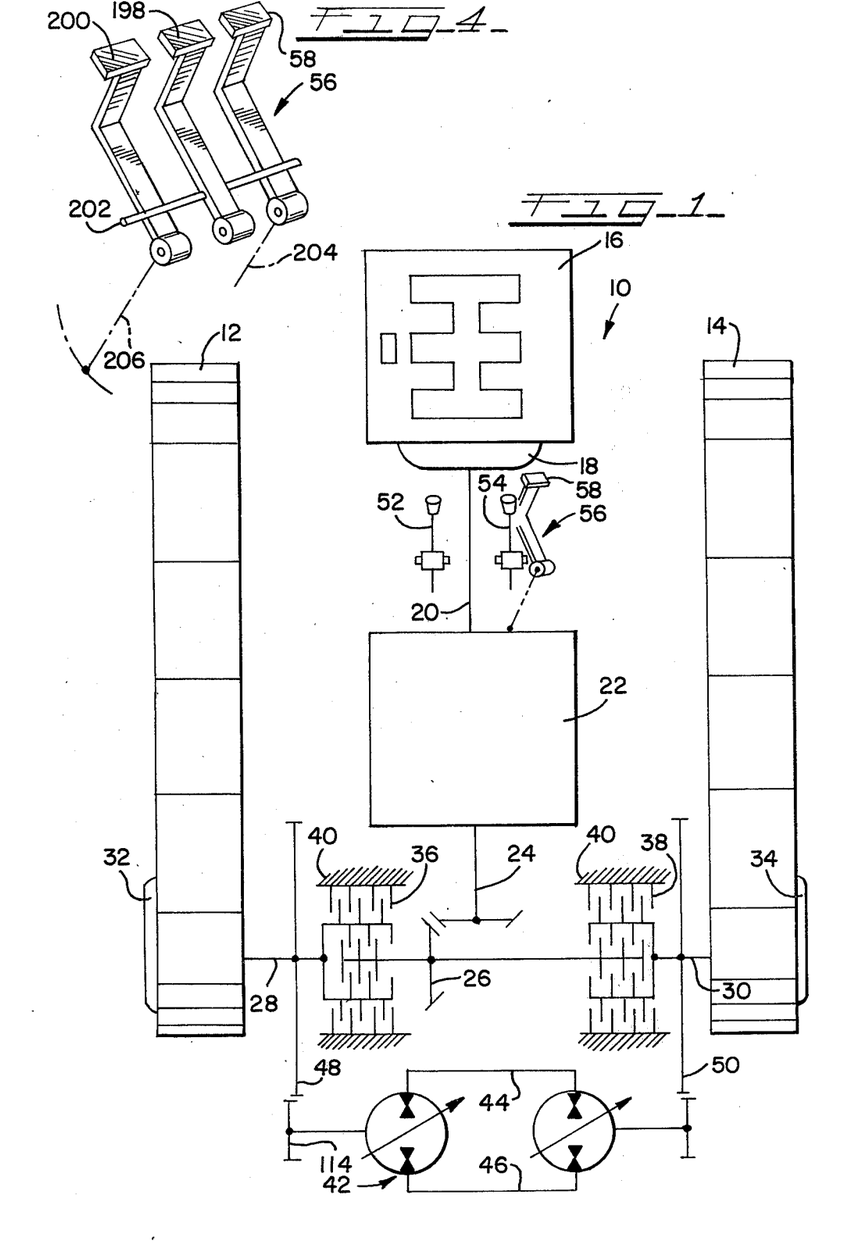
FIG. 1 is a schematic diagram in top plan of an arrangement of power source, power train, and steering drive in a crawler tractor embodying the present invention.
FIG. 4 shows a complete brake pedal arrangement which appears only suggestively in FIG. 1.

More particularly, in FIG. 1 of the drawings, a crawler tractor 10 is shown having respective left and right endless crawler track assemblies 12 and 14 which are powered for steering by driving, and a forward mounted diesel engine 16 with appropriate connections for powering the tracks. Specifically, power from the engine 16 is transmitted through a torque converter 18, a power shift transmission input shaft 20 and transmission 22, a transmission propeller shaft 24, solid axle drive means comprising a bevel gear 26 which is driven by a meshing pinion on the propeller shaft 24, and an oppositely extending pair of controlled output axles 28 and 30 connected by respective left and right final reduction gearing 32 and 34 to the corresponding tracks 12 and 14.

A left clutch/brake unit 36 and a right clutch/brake unit 38 provide part of the control over the axles 28 and 30 in accomplishing steering by driving. The clutch/brake units 36 and 38 control the axles 28 and 30 by a set clutch or a slip clutch action from the solid axle drive 26 for frictionally driving same independently of one another, and control the axles 28 and 30 by set brake or drag brake action with respect to the fixed tractor steering housing 40 for frictionally independently arresting their motion.

Further control over the axles 28 and 30 is provided by a variable ratio, dual unit, bidirectional drive 42 having cross feed connections 44, 46 for energy interchange between units and having pinion and gear speed reduction gearing 48 and 50 fast to the clutch outputs so as to interconnect the oppositely extending axles 28 and 30.

Because a reduced speed drive at fixed ratio can be afforded by the bidirectional drive 42 as from, for example, the pinion and gear reduction gearing 50 to the opposite pinion and gear reduction gearing 48, it will be apparent in the steering drive arrangement, if properly controlled, that the clutch in unit 38 when in full set engagement can drive the gearing 48 and opposite axle 28 at a fixed reduced speed ratio either with partial help from the clutch in unit 36 or without its help. Also, with no help from the bidirectional drive 42, the clutches of the units 36 and 38 when the two are in set engagement will inherently cause straight line steering of the tractor 10 because of the 1:1 solid axle connection of the two axles 28 and 30 with respect to one another and to the solid axle drive 26 therebetween.

The operator's controls are merely suggested in FIG. 1, consisting of left and right steering levers 52 and 54 and a brake pedal assembly 56 as represented by the right pedal 58.

Figure 2:
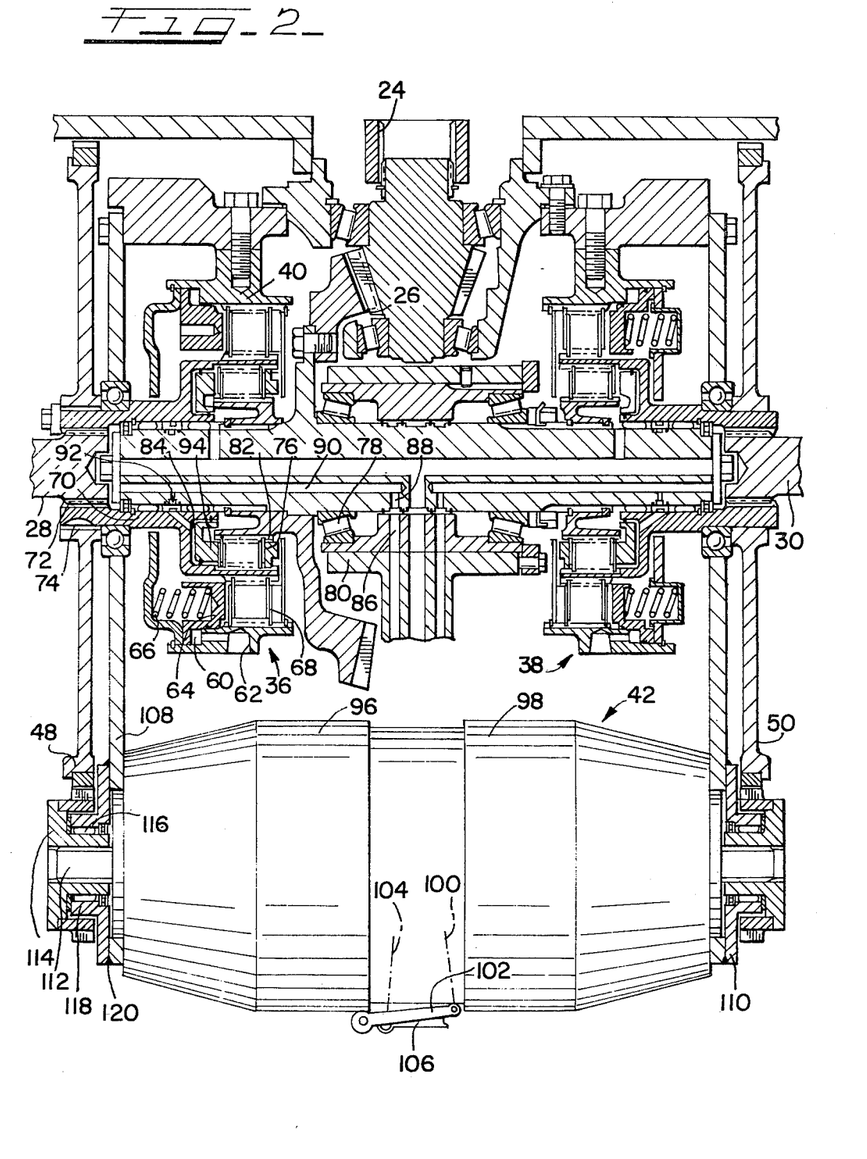
FIG. 2 is a plan view of the steering drive including the axles, and showing the actual variable ratio hydrostatic bidirectional drive interconnecting the axles.

CLUTCH/BRAKE UNIT 36—FIG. 2

Parts which are the same as carried over into FIG. 2 are identified there by the same reference numerals with which they were identified in FIG. 1 and the same description applies.

In the clutch/brake unit 36, a brake-pedal-controlled, fluid-operated, power brake cylinder 60 has an inlet-outlet brake port 62 through which hydraulic fluid is applied to release the brake piston 64 partially or fully to a brake disengaged position with respect to the tractor steering housing 40. A fail safe feature is employed whereby a set of brake springs 66 will, in absence of hydraulic pressure, force the brake piston 64 to compress the stack of brake friction disks 68 so that they mutually engage for fully setting the brake.

A double splined, disk-carrying output member 70 of the unit 36 has a hub which is axle connected by a set of splines 72 and is gear connected by a key 74 and keyway in the gear of reduction gearing 48.

The disk-carrying output member 70 carries on its outer splines the inner disks of the brake stack 68 and carries on a set of inner splines the outer disks of a friction clutch disk stack 76.

The bevel gear 26 is part of a solid axle carrier carried in a span 78 of bearings in a manifolded bevel gear housing 80, and splines 82 on the solid axle drive carry the inner set of the stack of friction clutch disks 76. Hydraulic fluid is supplied to a clutch cylinder 84 through a bevel gear housing radial passage 86, bevel gear carrier radial passage 88, carrier axial passage 90, and interconnecting passages 92 between the axial passage and cylinder 84. A set of clutch return springs, not shown, opposes the action of hydraulic pressure on a clutch piston 94 which is pressure actuated in an engaging direction to cause slip clutch or full clutch action engagement.

RIGHT CLUTCH/BRAKE UNIT 38—FIG. 2

The clutch/brake unit 38 in FIG. 2 has a like construction to the left unit 36 and has an independent but like operation thereto as just described.

BIDIRECTIONAL DRIVE 42—FIG. 2

When the drive illustrated in FIG. 2 is providing straight line steering, the operation is mechanically achieved through the primary drive with both axles effectively locked together by the dual clutches and solid axle drive just described.

However, for small changes in heading achieved with the present infinitely variable steering, the hydromechanical steering mode is in effect wherein the primary mechanical drive and the secondary, dual unit bidirectional drive 42 each transmit a share of the steering-by-driving power and the latter dual units may therefore be smaller dimensioned than in all-hydrostatic or all-electrical dual path drive systems in which the units must be sized to transmit full traction power.

Basically for the purpose of drive 42 any conventional units can be employed wherein each of the two units in a broad sense is a generator/motor. The cross feed by energy interchange will in a larger sense be fluid current or electrical current between the two generator/motor units. Selsyn generator/motors are suitable in electrical applications, or other appropriate dynamos which are available on the market in stock or to order.

It is found to be of a particular advantage herein that each generator/motor unit be a fluid-driving pump/fluid-driven motor unit. I, therefore, am able to choose an incompressible medium to flow as the cross fed current so the respective dual left and right units 96 and 98 illustrated in FIG. 2 are strict hydraulic pump/motor units, with direct interdependence between their rotational speeds and the transmitted quantity of the incompressible hydraulic fluid, such as oil.

Although a tilting head pump/motor unit will be equally effective for the unit 96 and for the unit 98, an axial piston, swash plate type pump/motor is shown in each instance which is operable in four quadrant operation, i.e., as a motor and as a pump in both directions of rotation. So, not only are the units 96 and 98 each operable in both senses of rotation, either as a pump or as a motor, but also the delivery rate is adjustable because of the variable positive displacement pump strokes which can be constantly changed by varying the setting angle of the swash plate in known manner.

A so-called right steering linkage 100 sets a left unit stroke control lever 102 clockwise as viewed in FIG. 2 to a rearwardmost "home" position in which the swash plate concerned sets the axial pistons of the left unit 96 for maximum positive pumping displacement. A left steering linkage 104 similarly holds a right unit stroke control lever 106 in a rearwardmost home position for maximum stroke displacement.

The left and right units 96 and 98 hydraulically intercommunicate their liquid in the manner of an outright equal exchange and by connections later to be described. The pair are physically in end-to-end relation, reacting primarily against one another axially rather than having their rotary thrust component directed outwardly so as individually to necessitate heavy outboard thrust bearings. For their outwardly acting, coaxial static thrust component, the concentric units 96 and 98 are held between apertured heavy housing plates 108 and 110 and, as typified by the unit 96, its pump/motor shaft 112 is splined to the pinion 114 of the pinion and gear reduction gearing 48. The pinion 114 is journalled in rollers of a bearing 116 carried by a tubular flange extension 118 welded at 120 to the adjacent heavy housing plate 108.

Figure 3:
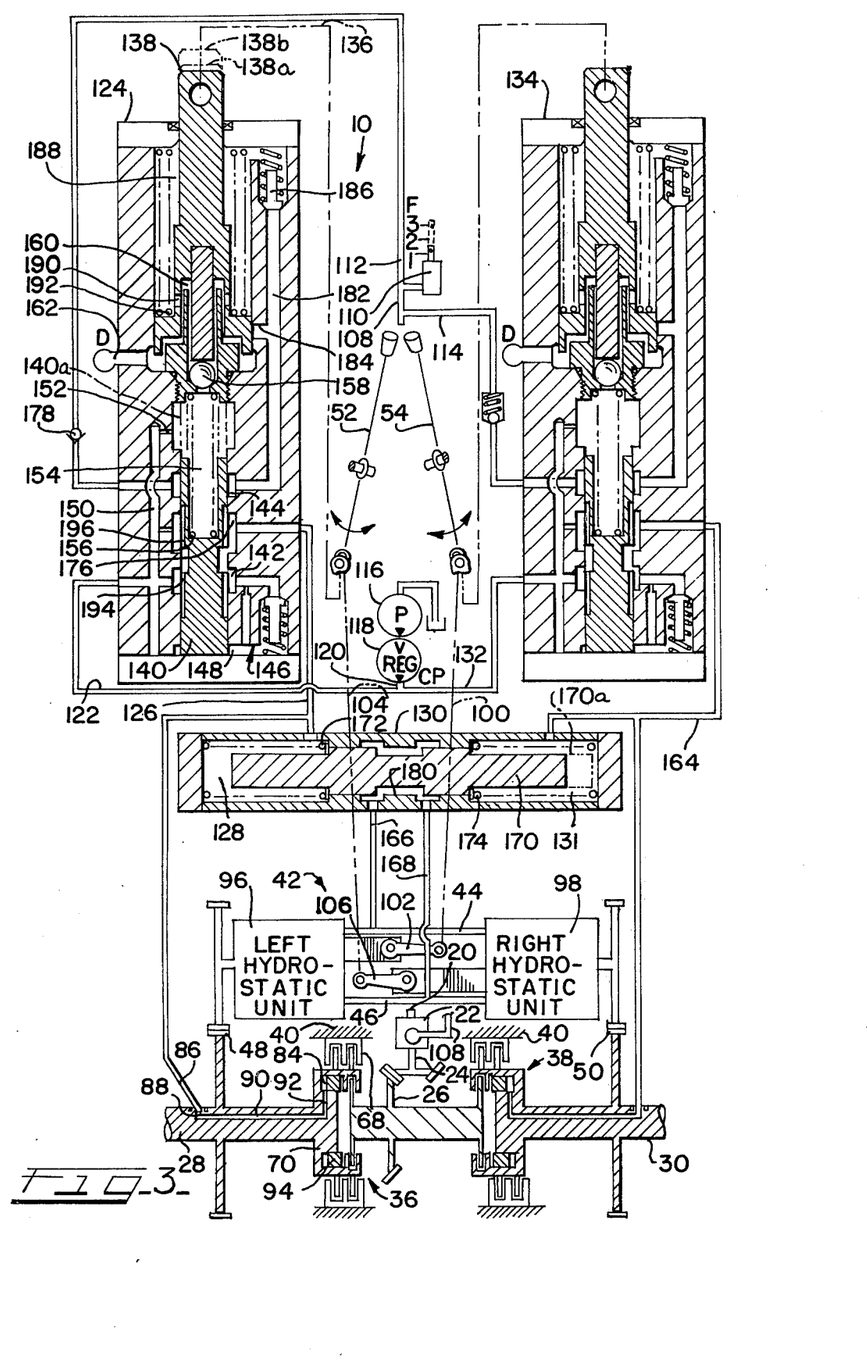
FIG. 3 is an hydraulic schematic diagram in top plan of the power train and steering drive including the bidirectional drive, wherein the latter is shown, not in the actual rearwardmost position it normally occupies, but rotated ahead 180° so as to be forward for draftsman's accessibility and clarity of its hydraulic connections.

LINKAGE CONNECTIONS—FIG. 3

As previously noted, the so-called left steering linkage 104 is connected as illustrated in FIG. 3 to the right unit stroke control lever 106 which operates the servo, not shown, controlling the right hydrostatic unit swash plate, not shown. That same left steering linkage 104 at its forward end relative to the rear axles 28 and 30 is connected to the left steering lever 52 for direct control by the tractor operator. The similarly connected right linkage 100 and the right steering lever 54 enable the tractor operator, with advancement of both steering lever handles forwardly, to set both hydrostatic steering units 96 and 98 for full positive displacement.

When the operator pulls the handles of the levers 52 and 54 to essentially a midway position toward him which will be toward the rear axles 28 and 30 as viewed in FIG. 3, the servos of the units 96 and 98 set them for zero displacement so that there is no flow at all speeds of rotation of the units.

Also for the units as typified by the right pump/motor unit 98, hand pulling of the left lever handle 52 full rearwardly toward the operator causes the right unit stroke control lever 106 to move the maximum forwardly from its "home" position into a full negative displacement setting, i.e., the unit has maximum displacement but flow is reversed therethrough, with the direction of rotation of the axial pistons therein remaining unchanged at the time. The consequence of a pumping unit continuing its direction of rotation while being given a negative displacement to full negative setting is that the reversed flow to the receiving unit causes the latter to reverse and build its rotation to an exactly equal but opposite speed to the pumping unit because the opposite flows always stay equal in volume.

TRANSMISSION CONNECTION—FIG. 3

The single transmission connection of pertinence herein is designated 108 in FIG. 3 at the respective points where its ends are connected respectively to the first clutch cylinder of the power shift transmission 22 and its corresponding clutch port on a conventional transmission selector valve 110. The reason is that the connection 108 forms a convenient expedient herein for connecting thereto a dump line 112 and another dump line 114 hereinafter described. Hydraulically deactivating the first clutch cylinder dumps both lines.

The selector valve 110 is movable by the operator among positions in which the plunger has a speed 1 position as shown in solid lines, an intermediate or speed 2 position not shown, and a speed 3 position as shown in broken lines in FIG. 3. Only positions for speeds in the F range for forward are represented, and it will be understood that rear range speeds 1, 2, and 3 will also be provided for by the valve 110. Also, necessary hydraulic connections to the various other fluid actuated clutches of transmission 22 will be provided but are not illustrated herein.

HYDRAULIC CONNECTIONS—FIG. 3

An engine driven pump 116 is shown in FIG. 3 which draws hydraulic fluid from supply and pumps it through a pressure regulating valve 118 into a line 120. The line 120 from the pump splits into branches including a left branch forming an input line 122 at charge pump pressure to a left clutch valve 124.

Output at various levels established by the clutch valve 124 flows through a left clutch line 126 which supplies the left servo chamber 128 of a bypass valve 130 and also supplies the left clutch/brake gear housing radial passage 86 by which the clutch cylinder 84 is pressurized in the left clutch/brake unit 36 of the tractor.

Another servo chamber 131 of bypass valve 130 and also the clutch cylinder of the other clutch-brake unit 38 are fluid operated under valve control through another branch from pump 116 forming an input line 132 to a right clutch valve 134.

CLUTCH VALVE 124—FIG. 3

Clutch valve 124 as shown according to FIG. 3 is operated in exact coordination with the linkage 104 by means of an essentially parallel linkage 136 connected to a reciprocal control plunger 138 in the valve 124.

In valve 124, a two position spool 140 selectively connects the clutch cylinder 84 to a high pressure valve bore core 142 or a reduced pressure valve bore core 144, and is controlled by the plunger 138. In the controlled position of the spool 140 as shown in solid lines in FIG. 3, the clutch valve input line 122 keeps the opposite spool ends in hydrostatic balance by applying charge pump pressure in a path leading through the core 142, through the restriction of a flow-check valve generally indicated at 146, and thence into an end chamber 148 connected to the flow-check valve and occupied by the corresponding end of the spool 140, and by applying equal and opposite charge pump pressure in a path through a transfer passage 150 and a slow down restriction 152, thence into a drainable end chamber 154 occupied by the corresponding end of the spool 140. So an unresisted return spring 156 therein readily holds its surrounding spool 140 in the solid line position shown.

At the first increment of movement into the broken line position 138a of the control plunger 138, a ball valve 158 previously seated thereby is unseated by charge pump pressure existing in end chamber 154; the so-called equal and opposite pressure in that end chamber 154 immediately reduces to drain pressure as it drains in a path through a hollow 160 in the end of plunger 138 and through a drain passage 162 to drain D. So instantaneously, charge pressure in the end chamber 148 thrusts the two position spool 140 into its second position as shown by the broken lines 140a. No delay arises from restricted flow because the incoming fluid readily unseats the check in the flow-check valve generally indicated at 146.

The draining of the drainable end chamber 154 is stopped immediately the ball valve 158 is restored to its seat by the control plunger 138. Gradually the spool 140 will then be returned to the solid line position by a three way coordination. The slow down restriction 152 slowly restores pressure in the end chamber 154 to an equal and opposite value at charge pressure level. The return spring 156 slowly pushes the spool toward the solid line position as the opposite end chamber pressures are brought into equalization. And the restriction of the flow check valve 146 gradually allows the returning spool 140 to displace the liquid in end chamber 148 so that the end of the spool can reoccupy the end chamber 148.

CLUTCH VALVE 134—FIG. 3

The right clutch valve 134 as shown according to FIG. 3 has the same construction and operation as the previously discussed valve 124. The valve 134 is supplied from its input line 132 under charging pressure and the outlet from the valve 134 enters at valve controlled pressure into a right clutch line 164.

BYPASS VALVE 130—FIG. 3

Because as a practical matter the hydrostatic units 96 and 98 will not have identical outputs even though rotating at identical speeds, their interconnections 44 and 46 for cross feed are bypassable through the tap connections 166 and 168 leading to the bypass valve 130. A shuttle element 170 in the bypass valve 130 has a pair of centering springs 172 and 174 which the clutch lines 126 and 164 automatically allow to center the valve mechanically whenever they apply somewhat of the same order of clutch pressures in both valve servo chambers 128 and 131. The automatic bypassing discontinues whenever the steering levers 52 and 54 reach substantially different angular settings.

In theory, of course, the two hydrostatic units 96 and 98 when at maximum displacement position at equal speed are circulating oil through their hydraulic interconnection at essentially zero pressure. The bypass valve 130 when centered ensures such zero pressure circulation by bypassing the one unit which might tend to operate as a motor, and so the other unit if acting as pump cannot build up pressure.

STRAIGHT LINE SPEEDS 1, 2, 3—FIG. 3

When the transmission selector valve 110, FIG. 3, occupies each of the F positions 1, 2, or 3 in forward range, and the handles of the steering levers 52 and 54 are in the full forward position, the plungers of valves 124 and 134 occupy the solid line positions shown and, as typified by the clutch valve 124, the two position spool 140 occupies the solid line position as shown. Both hydrostatic units 96 and 98 are in maximum positive displacement condition producing no output and absorbing only the minor power to cover friction of the circulating fluid and known as windage loss.

In the clutch valve 124, the spool 140 directs inlet flow from line 122 under charge pressure through the bore core 142, through the adjacent communicating bore core 176, and thence, undiminished, into the left clutch line 126 so as fully to engage the clutch in the clutch/brake unit 36 on the left side of the tractor. The servo chamber 128 in valve 130 is likewise under charge pressure from the clutch line 126.

Similarly, the opposite servo chamber 131 of the valve 130 coacts to keep the shuttle element 170 centered and the corresponding clutch of clutch/brake unit 38 on the right side is fully engaged.

So the tractor 10 will proceed under the drive of the transmission 22 in straight line steering forwardly at whatever speed 1, or speed 2, or speed 3 is set by the selector valve 110. Neither unit 96 or 98 can labor because they are both automatically bypassed by the centered valve 130.

A similar situation would occur in the reverse range of the transmission selector valve, a range not shown.

SPEED 3 HYDROSTATIC TURN ONLY—FIG. 3

Let it be assumed that, from a full forward position of the handles of the steering levers 52 and 54, the operator changes the position of one by pulling the handle of lever 52 at least an incremental amount to where the plunger 138 assumes the broken line position 138a or travels anywhere therepast short of the broken line position 138b thereof.

The spool 140 will immediately move to the position shown by the broken lines 140a as described, connecting the clutch line 126 not with charge pump pressure through core 176, but rather with the reduced pressure from core 144 through core 176. Because the speed 1 clutch cylinder of transmission 22 is connected by valve 110 to drain during the speed 3 condition, the connecting dump line 112 dumps the core 144 to drain through an unseating check valve 178.

So not only does the speed 1 clutch transmission 22 remain disengaged but also the draining clutch cylinder 84 of the left clutch/brake unit 36 disengages the clutch of that unit from the left axle 28.

Excess of power being supplied by the opposite unit 38 to the right axle 30 is therefore transferred mechanically by the gearing 50 to the right hydrostatic unit 98, transferred hydrostatically to the left hydrostatic unit 96 at whatever fixed positive hydrostatic ratio is set less than 1:1, and applied to the left axle 28 at that speed reduction ratio as dictated by and as transmitted by the hydrostatic drive.

When the operator pulls farther backwardly on the handle of the left steering lever 52, the control lever 106 of the right hydrostatic unit 98 will move forwardly and the plunger 138 of the clutch valve 124 will project outwardly farther forwardly through the position 138b and outward. Displacement in the right hydrostatic unit 98 acting as pump will continue to diminish until, at midpoint in steering lever adjustment, the pump output will as previously noted become zero and the hydrostatic speed ratio will be reduced to 0:1, i.e., the left axle 28 will be hydraulically locked. Still, as always, the units will remain hydraulically locked to maintain equal and opposite volumetric outputs, i.e., 0 gallons per minute. A pivot turn to the left will ensue, in which the tractor pivots about the left track which is stationary at the time and which is not shown.

From the pivot turn condition, the left axle 28 can be slowly built up to reverse rotation by the operator further pulling the handle of the left lever 52 rearwardly. Full rearward position, reversing the pumped flow under full displacement as previously noted, causes a so-called spin turn about a vertical axis centrally of the vehicle. At that time the fixed hydrostatic ratio is −1:1 and spin is to the left.

It will be noted that, due to the drain connected condition of the clutch line 126, for example, the equal and opposite pressure in servo chamber 128 will have been drained off. The centering spring 172 of bypass valve 130 will be overcome by the pressure in servo chamber 131 so as to shift the valve shuttle 170 completely to the left as viewed in FIG. 3. So a bypass bore 180 will be closed off by an adjacent spool portion of the valve shuttle 170 and the equal and opposite volumetric cross feeds 44 and 46 between units will be fully effective to hydraulically maintain the set speed reduction ratios between the hydrostatic units 96 and 98.

The same will apply during hydrostatic steering to the right and the valve shuttle 170 will automatically move to the bypass blocking broken line position 170a.

If the handles of both levers 52 and 54 are pulled back by the operator an incremental amount or any amount thereover so as to drain the clutches of both units 38 and 36, the servo chambers 128 and 131 of the bypass valve 130 will both be simultaneously connected to drain through the clutch lines 126 and 164, thus bypassing the units 96 and 98 hydraulically with respect to one another. Therefore, the vehicle will coast and each of the undriven axles 28 and 30 can "motor" unihibited. And at the time, neither clutch in units 36 and 38 is connected to drive or otherwise to interfere with free rotation of the axles 28, 30.

SPEED 2 HYDROSTATIC TURN ONLY—FIG. 3

Because the speed 1 clutch cylinder will be drain-connected through the line 108, the speed 2 steering condition will be the same as the speed 3 steering condition just described. Ground speed, of course, will be at an intermediate speed sometimes referred to as second gear and the operator will be afforded infinitely variable steering control from just below the 1:1 ratio continuously through 0:1 ratio to −1:1. Incrementally set steering curvature radii can be set among these ratios for right turn and left turn steering, all in this second gear operation of the crawler tractor.

At any event in order to resume straight line steering while executing a right turn on a given arc, the handle of the right lever 54 is made to approach and to take a duplicate forward position to the fully forward handle of the fully released left lever 52. In its approach, the advancing right lever handle increases the left unit's displacement toward the amount of greater displacement of the right unit 98, thus causing the speed of unit 98 to increase to parity with the left unit.

SPEED 1 HYDROSTATIC TURN MODE—FIG. 3

Under the speed 1 condition as set by the selector valve 110, the plunger 138 of left clutch valve 124 when pulled so that it projects into the broken line position 138b of FIG. 3 or projects farther outwardly, will initiate all-hydrostatic steering in response to actuation by the left steering lever 52 for good reason. The reason is that the left clutch cylinder 84 and the left servo chamber 128 of bypass valve 130 are vented to drain in a path through clutch line 126, bore core 176, the valve opened bore core 144, a reduced pressure gallery 182, a plunger-valve-opened port 184, the hollow 160 at the end of the plunger 138, and the drain line 162, thence into the drain D.

The result is that the bidirectional drive 42 is able to handle the moderate radius turns and all the more drastic turns of the tractor in its efforts requiring the high power of low gear and, each unit 96, 98 by its output determining the speed at which the other is running at all displacement settings of the latter.

The same steering conditions obtain for right turns exerted by the steering lever 54 under a speed 1 setting of the transmission selector valve 110.

SPEED 1 SINGLE RELEASE STAGE FOR CLUTCH PRESSURE—FIG. 3

During a left turn, for example, when the plunger 138 is in or between its respective positions as shown by the broken lines 138a and 138b, the reduced pressure bore core 144 is blocked from drain pressure because the reduced pressure gallery 182 and port 184 are blocked by the plunger 138. The spool 140 will be at this time in the broken line position as shown by the broken lines 140a, thus introducing charge pump pressure through the restriction 152 into the blocked off gallery 182.

A pressure regulating valve 186 connects the gallery 182 through a spring chamber 188 and plunger ports 190 to the drain passage 162 leading to drain D. The regulator valve 186 can be set at a clutch-pressure-maintaining value of 207 kPa (30 psi), for example, so that the intercommunicating bore cores 144 and 176 can hold the clutch cylinder 84 under a single release stage of pressure for slip clutch condition.

Accordingly, when the lever-connected plunger 138 is in or between its positions as shown by the broken lines 138a and 138b, the resulting slight steering corrections made at speed 1 condition are effected in part by torque from the bidirectional drive 42 and for the balance by the torque help afforded through the slip clutch of the left clutch/brake unit 36.

Under average circumstances, the proper division of power in terms of left track slip torque could, as an example, be with seventy percent contributed by hydrostatic torque and thirty percent from the slip clutch action.

Two facts stand out, in this heavily loaded steering condition of the tractor. In the just described gradual (long turn radius) severe steer mode, the slipping clutch of the unit 36 would be slipping at very low pressure (207 kPa) and relative speed (speed 1) as taken by the slower track, so that, first, the power loss would be minimal. Secondly and equally importantly, the dual units of the bidirectional drive 42 are therefore selected so as to be relatively small inasmuch as, normally, only a small portion of the torque is transmitted to the inside track and under severe conditions and drive 42 is augmented in its effort by the slip clutch in the clutch/brake unit. The contrast is apparent with the conventional dual-path hydrostatic drive system in which the units must be sized to transmit full power.

During the augmenting mode just described, the drive is hydromechanical. The slip clutch, brake/clutch unit serves merely to add torque. The pump/motor units of drive 42 are what fixes the gear reduction ratio because they are axial piston, hydrostatic units operating strictly with liquid.

The fixed hydrostatic ratio during hydromechanical drive and during hydrostatic drive is maintained irrespective of which track is the inside track and which of the dual units 42 is functioning as pump. The inside track as a matter of fact tends to run at essentially full speed if undriven when a crawler is under no load, it tends to overspeed when the tractor goes downgrade whether drawbar loaded or unloaded, and it tends to overspeed under most ordinary circumstances during any tight or small radius curvature of turn. So slowdown torque is sometimes required on the inside track in order that its tendencies toward run-away speed can be controlled.

But the exactly maintained displacement ratio between the dual units of the bidirectional drive 42 will keep the inside track at the proper reduced speed irrespective of whether the inside unit of the drive 42 is running usually in its role as a motor or has begun operating as the actual pump in the drive.

Although theoretically the port 184 and the reduced pressure therein can be modulated to an extent by the valve action of the plunger 138 as it cracks open the port, viewed more as a practical matter there is only a single release stage here of the clutch pressure for clutch slip action. On that basis, the following two tables set out what could be expected in practice and are given purely by way of illustration and not of limitation. It is to be kept in mind that, in the sequence of drawing back on a steering lever handle, the zero (drain) clutch pressure is attained considerably prior to the mid-swing point at which the pivot turn (0:1) speed reduction ratio is reached.

| Clutch pressure | Clutch action | Bypass valve |
|---|---|---|
| full engagement value | engagement fully set | bypassing |
| 689 kPa (100 psi) | perceptible slippage | shifts |
| 207 kPa (30 psi) | effective slip clutch action | blocks bypass |
| Zero (drain) | disengaged | blocks bypass |
| Clutch pressure | Drive 42 | Plunger protrusion |
| full engagement value | bypassed | solid line position 138 |
| 689 kPa (100 psi) | activates | broken line and only up to 138b |
| 207 kPa (30 psi) | fixed reduction ratio | broken line and only up to position 138b |
| Zero (drain) | fixed reduction ratio | broken line position 138b and |

| -continued |
|---|
| farther |

From the tables, it can be seen that the single release stage for clutch pressure is at the level of 207 kPa for effective slip clutch action. That action obtains at that pressure from and including the point at which the slower track speed is at a reduction ratio just barely below 1:1, and continues to and including a point where the inside track turns at a somewhat lower speed reduction ratio. At the latter point, the clutch pressure abruptly drops to zero and the drain connected clutch is fully disengaged by the clutch springs, not shown.

For all speed reduction ratios therebeyond, the drive to the inner track is transmitted hydrostatically.

SPEED 1 CLUTCH PRESSURE RELEASE STAGE MODULATED—FIG. 3

If the regulating valve 186 in FIG. 3 is changed to a modulating valve of well known construction and the modulating valve is made linearly pressure responsive to movement of the plunger 138, the response of the gallery 182 to these two modifications will be that the pressure will be linearly modulated beginning with predetermined initial motion of the plunger 138 from 207 kPa linearly down to a zero drain pressure obtaining in the gallery 182 at the point at which the present plunger opens the port 184 which is connected to drain.

While the two modifications will allow the slip clutch to make an overall lesser contribution of augmenting mechanical torque to the inside track, the overall clutch slippage will be occurring under less pressure overall and clutch frictional wear and frictional heat will be of a lesser magnitude and better controlled. U.S. Pat. No. 4,015,619 discloses a suitable known construction of clutch-metering or modulating valve piloted by the precisely set signal pressure of a hydropotentiometer from which the signal pressure varies exactly linearly with hydropotentiometer displacement.

HAND LEVERS RELEASED, SPEEDS 1, 2, 3—FIG. 3

A set of return springs 192 in spring chamber 188 for the lever connected plunger 138 of left clutch valve 124, for instance, will respond to release of the appropriate left steering lever 52 as seen in FIG. 3 by immediately seating the ball valve 158 so as to block end chamber 154 from drain. But the resulting delayed action already described of the spool 140 in restoring itself from the broken line position 140*a* to the solid line position will insure only a smooth and gradual clutch re-engagement.

More specifically, the spool 140 in its return and as it slowly fully reconnects the cores 142 and 176, will restrict the clutch pressure rise by intervention of the area-controlling spool slots 194 and 196. Thus, as the slots 194 and 196 slowly move in unison to increase the flow area from the bore core 142 and decrease the flow area from the reduced pressure core 144, the pressure in clutch line 126 only gradually rises. At or about the point at which the slip clutch action ceases, such as perhaps 207 kPa, the rising pressure at 128 in the bypass valve 130 causes its shuttle element 170 to return to centered, open, bypassing position thus inactivating hydrostatic power flow.

The cycle is thus completed with the handles of both steering levers 52 and 54 fully forward for straight line steering at speeds 1, 2, 3 already discussed.

The right steering lever 54 after the handle is restored full forwardly will cause cushioned clutch engagement in the unit 38 for establishing straight line steering similarly to the manner just described.

TERTIARY DRIVE IN EMERGENCY—FIG. 4

A parking brake pedal 198 also serving as a service brake is effective to depress not only the right brake pedal 58 but also a left brake pedal 200 provided in the tractor, not shown. A cross rod 202 carried by the parking brake pedal 198 is schematically shown to overlie the other pedals for their coordinate depression with pedal 198.

The right pedal 58 has a right valve connection 204 and the left pedal 200 has a left valve connection 206 by which the pedals from foot pressure by the operator independently apply or release pressure to the axle brakes of the respective clutch/brake units 38 and 36, not shown.

Both brake cylinders are illustrated in FIG. 2 which has been previously described, and the particular left brake cylinder operated by the valve connection 206 was illustrated and described, and indicated by reference numeral 84.

In an emergency resulting from failure of the bidirectional drive 42 hydrostatically, or else mechanically such as by defective reduction gearing 48 or 50, a mode of clutch/brake steering can be inaugurated through hand control over the clutches such as the clutch 76, FIG. 2, and foot control over the brakes such as the brake 68, FIG. 2. So at each side of the vehicle, the operator can manually maintain a set brake or drag brake operation while the clutch is disengaged at that side, and similarly maintain a set clutch or slip clutch operation while the brake is disengaged at that side. So straight line driving can be accomplished and steering up to and including pivot braking can be accomplished in the emergency.

One of the more commercially attractive features of the present invention is that, through the addition of a hydrostatic pair of variable displacement pump/motor units, a commercial clutch/brake steering tractor can easily be converted in production from strict mechanical operation to hydromechanical operation. And, only in the emergency already noted of hydrostatic drive failure, will the strict clutch/brake steering system be employed.

Or if the commercial clutch/clutch brake steering tractors have the hydrostatic units removed and are fitted in production with known steering valves, they can be merchandised for their original low cost benefits and their conventional steering drive will offer the high efficiency characteristic thereof.

Of course, with hydrostatic failure or hydrostatic omission from the clutch/brake steering tractor, spin turns about the axis of the tractor are no longer accomplishable, nor is infinitely variable steering. The absence of drift is the same in each case for straight line 1:1 steering in forward or reverse range. Also in each case there is a positive neutral, whereby complete clutch disengagement eliminates any tendency of the tractor to have the creep which is very often evident in dual path hydrostatic systems on one track or the other, forwardly or reversely.

As herein disclosed, the invention is shown embodied in the steering control for the tracks of a crawler. It is evident that the stepless steering hereof will apply equally advantageously to other track type and nontrack type vehicles, for example, skid steer vehicles, self-propelled combines, and the like. In such vehicles and analogous ones which will occur to those skilled in the art, especially in the slower moving vehicles, the advantage according to the present invention will be recognized wherein the hydromechanically controlled or emergency controlled inside track will be the sole one which changes speed (by clutch slippage or disengagement) on turns; by way of comparison, turns tend to put steered, differential-equipped vehicles at a disadvantage in cases where each amount of inside track speed decrease is allowed to cause that same amount of outside track speed increase, which perforce would overburden the vehicle engine during all turns.

Variations within the spirit and scope of the invention described are equally comprehended by the foregoing description.

What is claimed is:

1. In hydromechanical steering by driving:
   a pair of oppositely extending axles (28, 30) having interposed solid axle drive means (26);
   clutches (36, 38) between the drive means and each axle (28, 30) to mechanically drive each, primarily so; and, secondarily so when only one clutch drives,
   a variable ratio dual unit bidirectional drive 42 consisting of generator/motor units and interconnecting the axles in a torque transferring axle-to-axle drive path.

2. The invention of claim 1, wherein the dual unit drive (42) is characterized by:
   a hydrostatic bidirectional drive wherein the dual units consist of variable displacement hydrostatic pump/motor units which by hydraulic drive thereto fix the axles' speed reduction ratio.

3. The invention of claim 2 characterized, tertiarily so, by:
   individual axle brakes effective to establish cooperation with the clutches (36, 38) on different ones of the axles for emergency control with all-mechanical steering by driving.

4. In a steered by driving vehicle (10):
   opposed traction drive output axles (28, 30) having an interposed primary solid axle drive means (26);
   a clutch (36, 38) between the drive means (26) and each axle to primarily drive each one mechanically;
   secondary pump/motor units (96, 98) drivingly connected one to each axle (28, 30) effective, by fluid cross feed when the clutch to one axle is disengaged, for hydraulically applying the power to hydraulically drive that one axle at fixed speed reduction ratios for steering said vehicle on turns; and
   a control (52 or 54) common to at least one unit and the clutch concerned for providing selectively to the axle concerned all drive thereto from one unit, or all drive thereto from the fully engaged clutch.

5. The invention of claim 4, the clutchs (36, 38) characterized by:
   controlled slip clutches with a mode of operation under controlled slip to mechanically add a substantial fraction of the energy at a high power, low speed reduction drive ratio of said one axle.

6. The invention of claim 5, further characterized by:
   tertiary means (56) connected one to each axle to tertiarily arrest the motion mechanically under controlled drag, and coactable with the controlled slip clutches (36, 38) functioning as steering clutches for clutch/brake steering of said vehicle solely mechanically.

7. A vehicle having:
   traction drive outputs at opposite sides thereof;
   secondary, variably-set displacement, hydrostatic bidirectional drive extending to each side of the vehicle and interconnecting the opposite outputs in a torque transferring hydrostatic drive path therebetween; and
   a primary drive clutch (36 or 38) connected between a common central solid axle drive means (26) and the output (28 or 30) at each side, effective upon disengagement of the opposite clutch to mechanically drive the output at 1:1 at that side and solely hydrostatically drive the opposite output at speed reduction ratios constantly fixed in dependence on the variable displacement set.

8. The invention of claim 7, characterized by said drive clutches (36, 38) upon mutual full engagement effective to provide primary drive with the outputs at a 1:1 speed ratio with one another and with their common solid axle drive means.

9. A steered by driving vehicle (10) having:
   opposed traction drive outputs (28, 30);
   secondary generator/motor units (42) adapted therebetween to interchange energy and drivingly connected one to each output;
   cross feed connections (44, 46) effective in vehicle turns to cause each unit by unassisted energy interchange strictly therebetween to provide all power driving the other at speed reduction ratios:
   primary axle drive means (26) connected to primarily drive each output mechanically; and
   operable means (36, 38) effective to selectively physically disconnect the primary axle means therefrom and interrupt primary mechanical drive to either output (28, 30) independently of said units so as to accommodate the secondary generator/motor units' power drive of same at their speed reduction ratios for steering the vehicle on turns.

10. The invention of claim 9, the secondary units and their cross feed connections characterized by:
    hydrostatic pump/motor units (96, 98) with their cross feed connections (44, 46) hydraulically affording unassisted liquid interchange therebetween.

11. The invention of claim 9, characterized by:
    said primary mechanical drive means (26) affording a fixed 1:1 speed ratio between the outputs (28, 30);
    said operable means (36, 38) also effective to partially interrupt the primary mechanical 1:1 drive by establishing a slip clutch drive to either output to augment the drive of the secondary unit (42) concerned.

12. The invention of claim 9, said operable means (36, 38) charcterized by:
    individual output brakes (68) effective to establish cooperation with the outputs (28, 30) during their physical disconnection by the operable means for emergency control of the outputs (28, 30) with all-mechanical steering by driving.

13. In a vehicle (10) in which the traction output is delivered to steering-by-driving traction elements (12, 14) carried at opposite sides of the vehicle:
    output-connected gear means at the opposide sides;
    a first device (96) capable of operating as a variably set generator or motor connected to the gear means at a first side, enabling the gear means at that side to be alternately in power-driving and power-driven relation thereto and at a speed reduction ratio, variable as desired;

a second device (98) capable of operating as a variably set generator or motor connected to the gear means at the second side, enabling the gear means at that side to be alternatly in power-driving and power-driven relation thereto and at a speed reduction ratio, variable as desired:

energy transfer means (44, 46) interconnecting the first (96) and second (98) devices effective by unassisted energy interchange strictly between devices to afford a speed reduction drive at the desired ratio delivered by the first device as variably set generator to the second (98) and to afford the second side gear means to be in power driven relation to the second device 98 to likewise assume the desired reduction ratio, and alternately to afford a speed reduction drive at the desired ratio delivered by the second drive (98) as variably set generator to the first (96) and to afford the first side gear means to be in power-driven relation to the first device to likewise assume the desired speed reduction ratio;

means for separately transmitting power to each of the gear means from drive transmission means including a clutch coupling (36, 38) at each side activatable selectively not at all and as a slip clutch and as fully engaged to ensure 1:1 drive transmission ratio therefrom to the gear means at that side independently of the drive/driven reduction ratio at the other side; and a control (52 or 54) common to at least one device and the clutch coupling concerned for providing selectively to the side gear means concerned all drive thereto from one device, all drive thereto from the device partly and from the slipping clutch coupling partly, and all drive thereto from the fully engaged clutch coupling.

14. The invention of claim 13, characterized by:
said common control having means of coordination (136, 104, 100, 134) to cause clutch coupling activation (36 or 38) at either side to be attended with increased output settings of the variably set device (96 or 98) at the opposite side, and vice versa.

15. The invention of claim 14, the clutch coupling (36 or 38) at each side characterized by:
a modulated multiple friction disk clutch (36 or 38) with the activation thereof at either side of the vehicle increasing from full slip directly proportionately with increasing output settings of the variably set device (96 or 98) at the opposite side, and vice versa.

16. In a vehicle (10) steered by driving:
pairs of steering levers (52, 54), traction drive output axles (28,30), spaced apart clutches (36, 38), and variable displacement pump/motor units (96, 98) disposed one at each side of the vehicle, the units adapted therebetween with cross feed connections (44, 46) to interchange their fluid and each drivingly connected to one of the output axles at that side, for hydrostatic axle-to-axle torque transfer for their secondary drive; and, for their primary drive, solid axle drive means (26) in the space between the clutches at the sides and coupled respectively by engagement of each to the output axle at that side;
each steering lever (52, 54) at the side of the vehicle operatively connected in common to the clutch at that side and to the pump/motor unit at the opposite side so that, coordinately with predetermined initial steering-motion movement, such lever at least partially disengages the clutch concerned and decreasingly varies the displacement of the pump/motor unit concerned so that as a pump it will progressively reduce speed of the other unit acting as a speed reduction motor providing hydrostatic drag on the axle concerned.

17. The invention of claim 16, the operative connection between the steering lever at each side and the clutch at that side being hydraulic for an hydraulic power cylinder clutch and characterized by:
a valve (124, 134) operated (136) by such steering lever having high pressure and low pressure connections (142, 144); and
an inlet-outlet clutch line (126, 164) between the valve and hydraulic power cylinder (84) of the clutch, selectively pressurized to introduce high pressure from the valve as clutch engagement pressure thereto, and to reduce said pressure to the low pressure.

18. The invention of claim 17, characterized by:
a bypass valve (130) sensitive to pressure in the clutch lines (126, 164) and interconnecting the cross feed (44, 46) when the two pressures in the clutch lines tend towards equalizing so as to cause the fluid to bypass the unit acting as speed reduction motor.

19. In the modes of steering a vehicle by driving, said vehicle having opposite traction axles including a first axle driven at a fixed 1:1 speed ratio and under a drive line drive affording to the first axle an excess of power transmittable thereby over and above the needs of said first traction axle, said first axle having a hydrostatic unit driven thereby and cross feeding power to a hydrostatic unit driven by the opposite traction axle (28), said opposite axle (28) and drive line drive having a slipping clutch interconnection (36) to augment drive of said opposite axle (28) by delivery of drive line power thereto,
the improved steps of steering the vehicle to a turn in which the first axle serves as outside axle on the turn, comprising:
applying slip clutch drive (36) to the opposite traction axle (28) to augment its drive by mechanical delivery of drive line power thereto at the reduced speed of slippage conditions while mechanically delivering (38) drive line power to the first axle (30) at the fixed 1:1 ratio described; and
hydrostatically transferring by cross feed (44, 46) the first axle's excess transmitted power to said opposite traction axle, affording the principal source of power input to the latter and hydrostatically positively fixing the speed reduction ratio at which said opposite traction axle (28) is driven.

20. The invention of claim 19, characterized by:
coordinating the mechanical slip clutch drive and hydrostatic cross feed so as to increase the mechanical slip as the positive speed reduction ratio is hydrostatically increased to greater reduction in speed.

21. The invention of claim 20, characterized by:
maintaining 100% slippage in the slip clutch drive during hydrostatic drive at and above a substantial speed reduction fixed ratio.

22. Method of hydromechanically turning to the side, by speed reduction drive ratio at that side, a steering by driving vehicle having a declutchable clutch at the intended slower one of its sides, solid axle drive means common to the slower side clutch and to the second side for equal power flow, 1:1 drive ratio between the driving sides in absence of a power disconnect by declutching said clutch, and crossflow interconnected, variable displacement, hydrostatic units operatively connected one at each driving side and by their relative displacements being hydrostatically locked to transfer driving power at fixed speed reduction ratios therebetween, said method comprising the steps of:

incurring selective power disconnect by declutching at the intended slower side so as to deliver all power flow to the second side;

utilizing no more than a major portion thereat of the power expended by the second side; and     hydrostatically at hydrostatically fixed speed reduction ratios transferring from the second side and delivering to the intended slower side all of the remaining portion of the power.

23. Method of hydromechanically turning to the side on a downgrade, by speed drive ratio at that side, a steering by driving vehicle having a declutchable clutch at the intended slower one of its sides, solid axle drive means common to the slower side clutch and to the second side for equal power flow, 1:1 drive ratio between the driving sides in absence of a power disconnect by declutching said clutch, and crossflow interconnected, variable displacement, hydrostatic units operatively connected at each driving side and by their relative displacements being hydrostatically locked to transfer driving power at fixed speed drive ratios therebetween, said method comprising the steps of:

incurring selective power disconnect by declutching and allowing the intended slower side to coast downgrade;

mechanically directing all vehicle power flow to the second side; and     hydrostatically at fixed speed drive ratios transferring from the intended slower side a substantial portion of power acquired thru regeneration from downgrade coasting and delivering the regenerated power to the second side to prevent relative overspeeding of the coasting slower side.

24. In a method of hydraulically skid steering a tractor having a pair of traction drive outputs (28, 30) disposed one at each side thereof, a pair of hydrostatic, likewise disposed, variable displacement pump/motor units (96, 98) adapted therebetween with an hydraulic cross feed to interchange their fluid and each drivingly connected to the one of the outputs disposed at that side, for their secondary drive at speed reduction ratios fixed according to the displacement settings; and, for their primary drive, a declutchable clutch at the intended slower one of the outputs and solid axle drive means common to the slower output clutch and to the second output for equal power flow, 1:1 drive ratio between outputs in absence of a power disconnect by declutching said clutch, the improved steps comprising:

relatively changing the setting of the units (96, 98) one to the other so that the one drivingly connected to the second output is set for accommodating infinite pump/motor speed of rotation at zero displacement with no flow in or out, while the slower-output-connected other unit is set for finite displacement in the pump/motor thereby being hydraulically locked against rotation due to flow stagnation caused by the one unit; and     declutching the slower output clutch so that the manner of making application of drive torque, for the outputs, is through output of the solid axle drive means thereto being consumed in the second output to which the infinitely rotatable one unit is drivingly connected with none consumed in that output with the declutched clutch to which the hydraulically locked unit is drivingly connected.

25. In a method of hydraulically steering a skid-steer tractor having a pair of traction drive outputs (28, 30) disposed one at each side thereof, a pair of hydrostatic, likewise disposed, variable displacement pump/motor units (96, 98) each drivingly connected to the one of the outputs disposed at the side and adapted therebetween with hydraulic crossfeeds different ones of which connect the hydraulic output of each pump/motor unit to the input of the other, for the secondary drive of the traction drive outputs at speed reduction ratios fixed according to the displacement settings; and, for their primary drive, a declutchable clutch (36 or 38) at the intended slower one of the traction drive outputs and solid axle drive means (26) common to the slower output clutch and to the second output for 1:1 drive ratio between outputs in absence of a power disconnect by declutching said clutch, the improved steps comprising:

increasing displacement from a full-power turn setting of the prior faster unit connected to the second output so as to have both units at maximum displacement setting for straight line steering whereby either unit with the relatively excessive hydraulic output is nearly matched by maximum hydraulic output of the other;

clutching the slower output clutch;

interconnecting the crossfeeds directly into one another so that the arrangement to apply drive torque to the outputs is with the consumed power output of the solid axle drive means thereto completely divided between the traction drive outputs (28, 30) and with the relatively excessive hydraulic output coming from said one unit directly bypassed back into its input to prevent back pressure from building up between units; and     decreasing displacement of the prior faster unit upon full declutching of said clutch to a full-power-turn setting whereby the just said unit hydrostatically drives at fixed speed reduction ratio the other unit and its associted intended slower output.

\* \* \* \* \*